United States Patent

[11] 3,588,677

| [72] | Inventors | Jury Lvovich Kleiman<br>Fontanka, 126, Kv. 25;<br>Nikolai Viktorovich Morkovin,<br>Krasnoputilovskaya ulitsa, 53, Kv. 73; Jury<br>Nikolavevich Jurikov, Fontanka, 172, Kv.<br>11, Leningrad, U.S.S.R. |
|---|---|---|
| [21] | Appl. No. | 823,016 |
| [22] | Filed | May 8, 1969 |
| [45] | Patented | June 28, 1971 |
| [32] | Priority | May 15, 1968 |
| [33] | | U.S.S.R. |
| [31] | | 1,240,060 |

[54] DEVICE FOR ROTATION OF A THERMOSTATTED SAMPLE
4 Claims, 11 Drawing Figs.

| [52] | U.S. Cl. | 324/0.5 |
|---|---|---|
| [51] | Int. Cl. | G01n 27/28 |
| [50] | Field of Search | 324/0.5 |

[56] References Cited
UNITED STATES PATENTS

| 3,091,732 | 5/1963 | Anderson | 324/0.5 |
|---|---|---|---|
| 3,100,866 | 8/1963 | Zimmerman | 324/0.5 |

*Primary Examiner*—Michael J. Lynch
*Attorney*—Waters, Roditi, Schwartz & Nissen

ABSTRACT: A spinner for rotating a sample to be investigated in an NMR probe comprises a thermostatted enclosure and an air-turbine separated by a chamber with an insulating gas and a disc. A rotatable tube holds the sample and extends axially through the enclosure, turbine and chamber, the disc being secured to the tube for rotation therewith. The rotor of the air-turbine is secured to the tube and has, in longitudinal section, the shape of two coaxially arranged truncated cones joined at their narrow bases while the stator of the turbine has an inner surface of a shape complementary to the rotor so that a small space remains between the stator and rotor through which the propelling gas is passed.

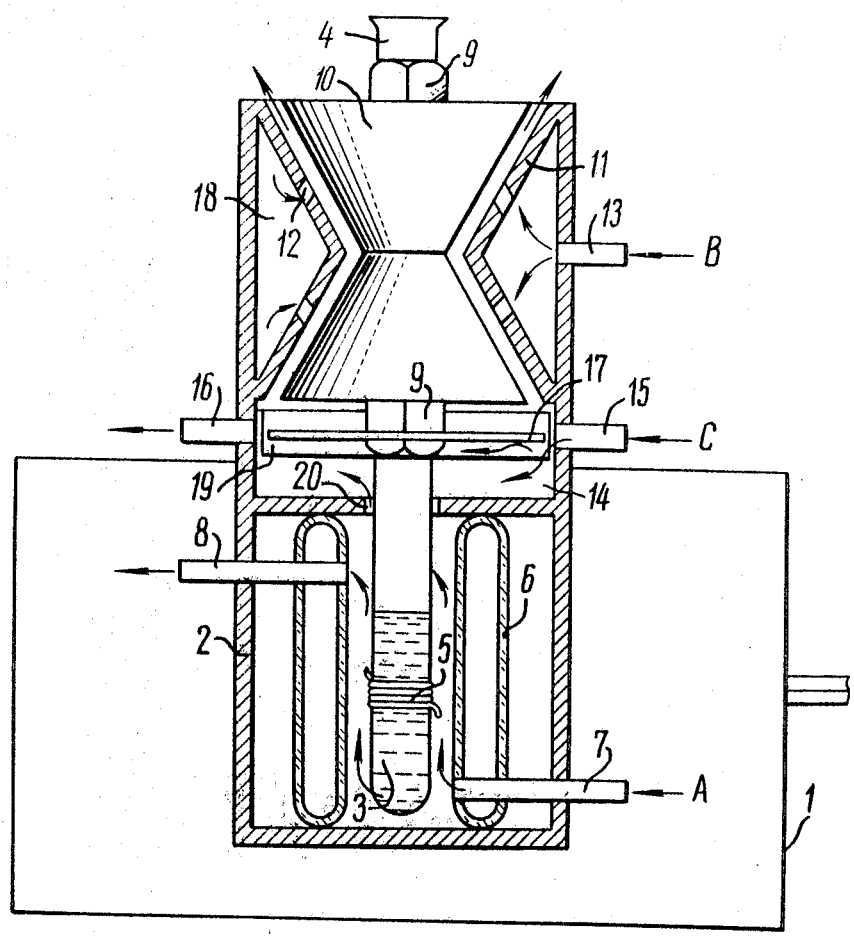

DEVICE FOR ROTATION OF A THERMOSTATTED SAMPLE

The present invention relates to analytical instrumentation, and more specifically to spinners, or devices for rotation of a thermostatted sample in a nuclear-magnetic-resonance (NMR) detector of an R.F. spectrometer.

There exist spinners in which the sample-holder is placed in a thermostatted enclosure and is coupled to a drive, such as an air turbine having a stator and a rotor.

In the existing spinners, the sample is surrounded by a shield which prevents the sample from being thrown out of the detector. This shield introduces a marked temperature gradient in the sample.

A major disadvantage of the existing spinners is also the fact that the rotor has the shape of a single truncated cone, so that when the rate of air flow through the stator nozzles to the rotor is increased, the gap between them also increases, and this affects the rotation stability of the rotor.

An object of the present invention is to eliminate the above-mentioned disadvantages.

A particular object of the present invention is to provide a spinner of high efficiency for the NMR detectors of R.F. spectrometers, which causes an insignificant temperature gradient in the sample, provides for the steady rotation of the sample, and permits control of rotational speed within broad wide limits.

This object is accomplished by a spinner for the NMR detectors of R.F. spectrometers, in which the sample holder is placed in a thermostatted enclosure and is coupled to an air-turbine type of drive having a rotor and stator. According to the invention, the rotor of the spinner is secured at least at one end of the sample holder and has the shape of two coaxially arranged truncated cones joined together at their narrow bases, while the stator is of the same shape as the rotor and defines a small space therebetween for passage of the propelling gas.

It is preferable to place, between the ends of the rotor and the thermostatted enclosure, a chamber with an inlet and an outlet for passing a thermal-insulating gas, to serve as a shield eliminating the effect of the temperature-controlling stream on the rotor.

For enhanced effect of the thermal-insulating gas, the chamber should preferably hold a disc permanently attached to the rotor.

With this type of spinner, it is possible to use inexpensive sample-holders and obtain highly accurate results.

The invention will be best understood from the following read in connection with the appended drawing which description of a preferred embodiment shows an axial section through a spinner for an NMR detector of an R.F. spectrometer, according to the invention.

Referring to the drawing, therein is shown a spinner for the NMR detector of an R.F. spectrometer, in which, according to the invention, a housing 2 holds an air-turbine type of drive for the sample-holder, a thermostatted enclosure, and a shield separating the drive from the thermostatted enclosure to eliminate the effect of variations in the temperature-controlling stream on the drive.

The sample holder comprises a test tube 4 which holds sample 3 and is surrounded by an R.F. coil 5. The test tube 4 is placed in the thermostatted enclosure which is a Dewar vessel 6 with an inlet 7 and an outlet 8, for passage of a temperature-controlling stream in the direction of the arrow A, and the test tube 4 is coupled to the drive by a collet chuck 9.

The drive of the test tube 4 comprises the collet chuck 9, a rotor 10 which is the shape of two truncated cones joined coaxially at their narrow bases, a stator 11 which has the same shape as the rotor 10, and nozzles 12 to admit air in the direction of the arrow B to the rotor 10 from a compressor (not shown in the drawing) through a port 13.

A shield that eliminates the effect of the temperature-controlling stream on the rotor 10 is formed by a chamber 14 placed between the ends of the rotor 10 and the Dewar vessel 6 and having an inlet 15 and an outlet 16 for passing a thermal-insulating gas in the direction of the arrow C.

In order to improve the efficiency of the thermal-insulating gas, the chamber 14 holds a disc 17 arranged coaxially with the rotor 10 and permanently attached to it by the collet chuck 9.

The spinner operates as follows.

Air coming from a compressor is admitted through the port 13 into the inner space 18 of the stator 11 from whence it flows out of the nozzles 12 to strike the rotor 10. This sets the rotor 10 in motion and produces an air cushion on each side between the top and bottom cones of the rotor 10 and the stator 11, thereby providing for steady and uniform rotation of the rotor 10. This air cushion maintains the clearance between the rotor and stator practically constant irrespective of any disturbances, thereby preventing the rotor from undergoing vibration and providing for self-alignment of the rotor 10.

As the rotor 10 rotates, part of the air stream is discharged upwards, around the perimeter of the stator 11, and another part downwards, through ports 19.

The temperature-controlling stream admitted by the inlet 7 reaches the test tube 4 holding the sample 3. The bulk of the temperature-controlling stream escapes through the outlet 8, while the remainder flows through an opening 20 into the chamber where it is ejected from the ports 19 by the disc 17 rotating with the rotor 10 and serving to eliminate the effect of the temperature-controlling stream on the latter.

When the sample 3 is thermostatted at subzero temperature, ice formation on the disc 17 and the rotor 10 is prevented by blowing a thermal-insulating gas through the chamber 14.

The spinner disclosed herein can use inexpensive sample holders and demonstrates high performance namely stability, uniform speed, freedom from jerking, stopping, etc., over a wide range of temperatures.

We claim:

1. A spinner for rotating a sample to be investigated in an NMR probe of an R.F. spectrometer, said spinner comprising a housing divided into first and second compartments, a thermostatted enclosure in one of the compartments, an air-turbine drive means in the other of the compartments, a sample holder in said housing extending in said compartments, said sample holder containing a sample disposed within said enclosure, means for applying an R.F. magnetic field to the sample in the holder, said air-turbine drive means comprising a rotor concentrically secured to the holder for rotating the same, and a stator surrounding the rotor, said rotor having the shape of two coaxially arranged truncated cones joined at their narrow bases, said stator being secured in said housing and having an inner surface which conforms to the rotor and defines a small space therebetween for passage of propelling gas, and means for introducing propelling gas into said space.

2. A spinner as claimed in claim 1 comprising a chamber in said housing between the drive means and the thermostatted enclosure, said chamber having an inlet and an outlet for passage of an insulating gas therethrough to thermally separate the enclosure and drive means.

3. A spinner as claimed in claim 2 wherein said enclosure includes means for passing a stream of a temperature controlling gas therethrough, some of said gas passing to said chamber.

4. A spinner as claimed in claim 3 comprising a disc in said chamber secured to said holder for rotation therewith to expel temperature controlling gas from the chamber.